US008453387B2

(12) United States Patent
Goepfert et al.

(10) Patent No.: US 8,453,387 B2
(45) Date of Patent: Jun. 4, 2013

(54) DISPLAY ARRANGEMENT HAVING PROFILE MEMBER FOR SUPPORTING A DISPLAY ELEMENT

(75) Inventors: Christin Goepfert, Erfurt (DE); Janine Goepfert, Erfurt (DE); Joachim Goepfert, Erfurt (DE)

(73) Assignees: Christin Goepfert, Erfurt (DE); Janine Goepfert, Erfurt (DE)

( * ) Notice: Subject to any disclaimer, the term of this patent is extended or adjusted under 35 U.S.C. 154(b) by 933 days.

(21) Appl. No.: 12/412,261

(22) Filed: Mar. 26, 2009

(65) Prior Publication Data

US 2009/0236485 A1  Sep. 24, 2009

Related U.S. Application Data

(63) Continuation of application No. PCT/DE2007/001731, filed on Sep. 25, 2007.

(30) Foreign Application Priority Data

Sep. 26, 2006 (DE) .......................... 10 2006 045 225

(51) Int. Cl.
*E04B 2/74* (2006.01)
(52) U.S. Cl.
USPC ................. 52/36.5; 52/36.1; 52/241; 52/282; 248/295.11; 248/245
(58) Field of Classification Search
USPC ............... 248/295.11, 245; 52/239, 241, 282, 52/632, 36.1, 36.5, 220.7, 238.1; 108/152, 108/137, 143; 211/184; 160/351
See application file for complete search history.

(56) References Cited

U.S. PATENT DOCUMENTS

| 3,316,863 | A | * | 5/1967 | Zock | 108/108 |
| 3,779,177 | A | * | 12/1973 | Gigante | 108/158.12 |
| 4,035,972 | A | * | 7/1977 | Timmons | 52/241 |
| 4,468,067 | A | * | 8/1984 | Jenkins | 312/140 |
| 4,716,692 | A | * | 1/1988 | Harper et al. | 52/36.6 |
| 5,012,625 | A | * | 5/1991 | Propst | 52/241 |
| 5,069,263 | A | * | 12/1991 | Edwards | 160/135 |
| 5,363,625 | A | * | 11/1994 | Philippi | 52/653.2 |
| 5,546,718 | A | * | 8/1996 | Way | 52/238.1 |

(Continued)

FOREIGN PATENT DOCUMENTS

| JP | 52-124816 U | 9/1977 |
| JP | 5210775 U | 8/1978 |
| JP | 63109821 | 5/1988 |

(Continued)

*Primary Examiner* — Nkeisha Smith
(74) *Attorney, Agent, or Firm* — Muncy, Geissler, Olds & Lowe, PLLC

(57) ABSTRACT

A display arrangement includes at least one profile, at least one essentially horizontally oriented planar rack element and at least one bracket element. The profile has at least one central web having two parallel inner flanges. The at least one profile can be oriented vertically, and the bracket element may be formed from a top part and a bottom part which can be drawn against one another by at least one tensioning screw. The top part and/or the bottom part are/is provided with clamping rails and/or clamping-rail segments which can be connected in a force fitting and releasable manner to the inner flanges by being plugged thereon, it being possible for each of the at least one rack element to be fixed in a force-fitting manner between the tensioning surfaces of a bracket element by the tensioning screw or of the tensioning screws being tightened.

13 Claims, 8 Drawing Sheets

U.S. PATENT DOCUMENTS

| | | | | |
|---|---|---|---|---|
| 6,141,926 | A * | 11/2000 | Rossiter et al. | 52/239 |
| 6,351,916 | B2 * | 3/2002 | Militzer | 52/239 |
| 6,493,995 | B2 * | 12/2002 | McKenzie | 52/36.4 |
| 6,513,288 | B1 * | 2/2003 | MacDonald et al. | 52/239 |
| 7,014,384 | B2 * | 3/2006 | Nicoletti | 403/234 |
| 2003/0140591 | A1 * | 7/2003 | Scherrer et al. | 52/716.1 |
| 2007/0227079 | A1 * | 10/2007 | Waalkes et al. | 52/36.1 |
| 2007/0234659 | A1 * | 10/2007 | Bruder | 52/239 |

FOREIGN PATENT DOCUMENTS

| | | |
|---|---|---|
| JP | 2004-248780 | 9/2004 |
| JP | 2006-239128 | 9/2006 |
| WO | WO 03/087488 A1 | 10/2003 |

\* cited by examiner

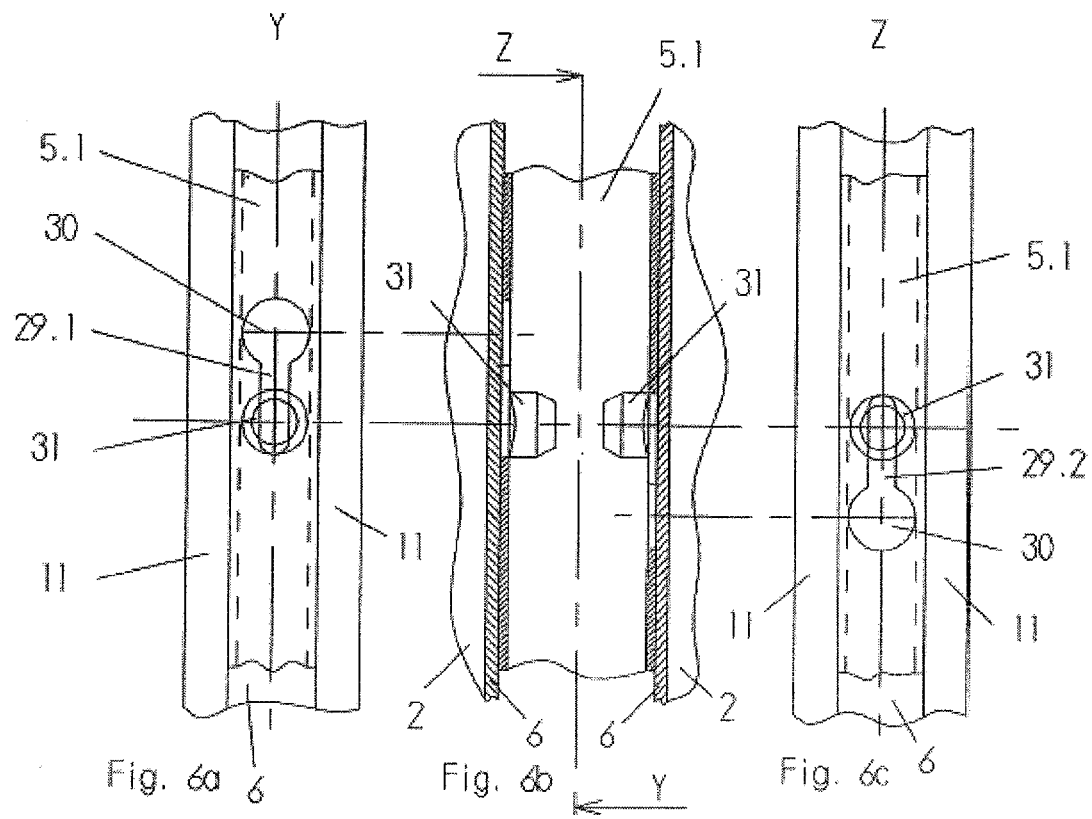
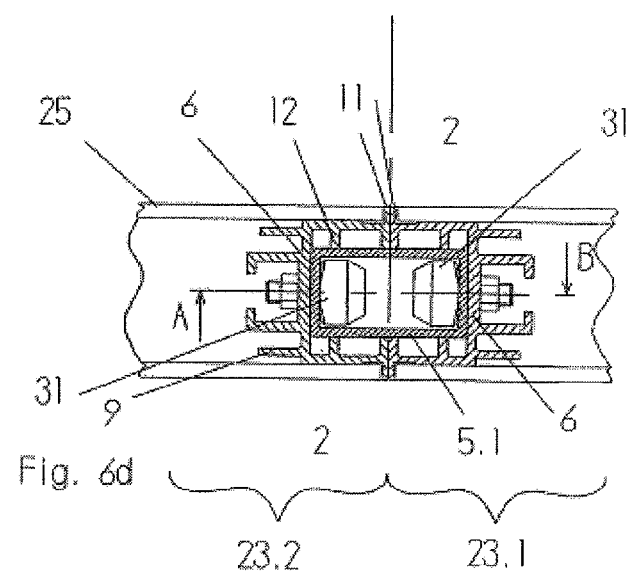

ically made of safety glass, and the paneling elements,
DISPLAY ARRANGEMENT HAVING PROFILE MEMBER FOR SUPPORTING A DISPLAY ELEMENT This nonprovisional application is a continuation of International Application No. PCT/DE2007/001731, which was filed on Sep. 25, 2007, and which claims priority to German Patent Application No. 10 2006 045 225.9, which was filed in Germany on Sep. 26, 2006, and which are both herein incorporated by reference.

BACKGROUND OF THE INVENTION

1. Field of the Invention

The invention relates to a display arrangement, for example, in the equipping of retail stores such as beauty salons or in the construction of exhibition stands.

2. Description of the Background Art

Such display arrangements are used in part for decorative purposes, in part for storage and display purposes, or to divide rooms. International Publication No. WO 03/087488 discloses a wall element with a base structure that is formed by a wrap-around frame on which vertical wall surfaces with planar paneling elements and horizontal support elements are arranged. Tracks to which connecting devices, not visible outwardly, are affixed detachably are arranged on the inner surfaces of the frame. Support elements are arranged on the connecting devices, at right angles to the wall, by means of a clamping connection. The vertical legs of the frame and the paneling parts covering the frame are concealed by means of U-shaped covering profiles.

They conventional display arrangements, however, have a disadvantage in that they require a relatively large number of parts with a correspondingly high assembly effort.

SUMMARY OF THE INVENTION

It is therefore an object of the present invention to provide an improved display arrangement.

A display arrangement according to an embodiment of the invention can include at least one profile made of one or more parts, at least one substantially horizontally oriented planar rack element, and at least one bracket element. Each profile can have at least one central web and arranged thereon two parallel inner flanges. At least one of the profiles is oriented vertically. The bracket element is formed from a top part and a bottom part, which can be drawn against one another by means of at least one tensioning screw, and each has a tensioning surface. The tensioning surfaces are substantially parallel to one another. The top part and/or bottom part are provided with clamping rails and/or clamping rail segments, which by plugging onto the inner flanges or by insertion between the inner flanges can be connected with these force-fittingly and releasably. Each rack element can be fixed between the tensioning surfaces of at least one bracket element force-fittingly by tightening of the tensioning screw or tensioning screws. The rack elements have, for example, the shape of glass shelves, which can be made of, for example, safety glass. The free adjustability of the height of the bracket elements and their simple and secure assembly is assured by the force-fitting pluggability of the clamping rails or clamping rail segments onto the inner flanges. Provided they are plugged onto the inner flanges, the clamping rails are arranged pairwise at a distance to one another, which corresponds approximately to or is slightly smaller than the distance of the outer surfaces of the inner flanges, so that a force closure results due to the elastic deformation of the clamping rails and/or the inner flanges. If the clamping rails or clamping rail segments, on the contrary, are inserted between the inner flanges, the distance of their outer surfaces corresponds approximately to or is slightly greater than the distance of the inner surfaces of the inner flanges. Clamping rail segments can be understood to be discontinuous clamping rails. In particular, the clamping rail segments at one of the inner flanges can be offset to the clamping rail segments at the other of the inner flanges in the longitudinal direction of the profile, because in this way they are simpler to produce and with saving of material than continuous clamping rails, particularly when the bracket element is cast. Both the clamping rails or clamping rail segments and the inner flanges may have edges, which are broken up in such a way that the joining together is facilitated. The two-part structure of the bracket element, particularly with two clamping screws, enables a uniform distribution of the press forces over the tensioned surface during tensioning of the rack element. The rack element in this area has corresponding bored holes or slots for the clamping screws. In addition, the two-part structure enables assembly from bottom to top, if a side insertion of the rack elements into the bracket elements is not possible.

Another display arrangement according to a further embodiment of the invention can include a frame, which is formed from at least four wrap-around profiles, particularly extruded profiles, each made as a single part, and on which at least one vertical planar paneling element is arranged. Each of the profiles has at least one central web oriented vertically to a plane enclosed by the frame, two parallel outer flanges, oriented to an outer side of the frame, and two parallel inner flanges, oriented to an inner side of the frame, whereby the distance between the inner flanges is smaller than the distance between the outer flanges. Each paneling element rests on an outer side of one of the outer flanges of at least two profiles. The paneling elements may have, for example, the form of nontransparent glass panes provided with decoration or textures. Display surfaces, advertising media, partitions, and the like can be produced at low cost in this way. The one-part formation of the profiles greatly reduces the assembly effort.

In this display arrangement as well, at least one horizontal rack element can be provided, which in each case can be held by at least one bracket element, whereby the bracket element, as described heretofore, may be made of two parts or in some other fashion. The bracket element is arranged adjustable in height on the inner flanges of at least one of two opposing, substantially vertically oriented profiles and has two substantially parallel tensioning surfaces and a guide with clamping rails or clamping rail segments, which by plugging onto the inner flanges or by insertion between the inner flanges can be connected with these force-fittingly and releasably. Each rack element is fixable force-fittingly between the tensioning surfaces of at least one bracket element. In particular, the bracket element is dimensioned such that it does not project over the outer sides of the outer flanges, in order not to impede the supporting of the paneling elements. Above and below each rack element, preferably one paneling element each attaches flush with the rack element. The fixation of the rack element in the tensioning device is concealed in this way, so that the overall aesthetic impression is determined only by the design of the rack elements, for example, in the form of glass shelves, particularly made of safety glass, and the paneling elements, for example, in the form of nontransparent glass panes provided with decoration or textures. The free adjustability of the height of the bracket elements and their simple and secure assembly is assured by the force-fitting pluggability of the clamping rails or clamping rail segments onto the inner flanges. Provided they are plugged onto the inner flanges, the clamping rails are arranged particularly pairwise at a distance to one another, which corresponds approximately to or is slightly smaller than the distance of the outer surfaces of the inner flanges, so that a force closure results due to the elastic deformation of the clamping rails and/or the inner flanges. If the clamping rails or clamping rail segments, on the other hand, are inserted between the inner flanges, the distance of their outer surfaces corresponds approximately to or is slightly greater than the distance of the inner surfaces of the inner flanges. Clamping rail segments are to be understood to be discontinuous clamping rails. In particular, the clamping rail segments at one of the inner flanges are offset to the clamping rail segments at the other flange of the inner flanges in the longitudinal direction of the profile. Both the clamping rails or clamping rail segments and the inner flanges may have edges, which are broken up in such a way that the joining together is facilitated.

In a further embodiment, the bracket element can be formed from a top part and a bottom part, which can be drawn against one another by means of at least one tensioning screw, and each has a tensioning surface, whereby the top part and/or the bottom part are provided with clamping rails and/or clamping rail segments. The rack element can be fixable by the tightening of the tensioning screw or tensioning screws. The two-part structure of the bracket element, particularly with two clamping screws, enables a uniform distribution of the press forces over the tensioned surface during tensioning of the rack element. The rack element in this area has corresponding bored holes or slots for the clamping screws.

In an embodiment, the bracket element can be formed from a top part and a bottom part, which can be drawn against one another by means of at least one tensioning screw, particularly two tensioning screws. The tensioning device is formed by horizontal surfaces, oriented against one another, of the top part and of the bottom part and by the tensioning screws. Particularly when glass shelves are used as rack elements, elastic layers can be provided between the rack element and the bottom part or top part for pressure distribution, to avoid point loads on the rack element. The rack element has bored holes or preferably slots for the tensioning screws, so that it can be inserted sideways into the not yet tensioned tensioning device, without the tensioning screws needing to be removed. The top part and/or bottom part are provided with clamping rails and/or clamping rail segments, so that both can be connected force-fittingly to the profile. The top part and/or bottom part may have a stop in an area adjacent to the profile, with which a minimum distance between the horizontal surfaces of the top part and bottom part can be predefined, so that the rack element is not damaged during tensioning.

The bracket element or the top part and/or bottom part can have at least one tab, which lies form-fittingly between the inner flanges or the fastening webs, at least when the bracket element is pressed maximally in the direction of the inner flanges. In particular, the bracket element has a tab each at the top and bottom end. When the bracket element with a top part and a bottom part is used, the top part and bottom part each preferably have an expansion tab at its respective top and bottom end. The improved form closure achieves increased security of the connection of the bracket element with the profile.

In an embodiment, the bracket element can be fixable by means of at least one fastening device, such as a securing screw. The securing screw provides additional security against the slipping of the bracket element out of the inner flanges. In addition, it facilitates the complete pressing of the bracket element onto the inner flange, so that the tab is pressed between the inner flanges.

Preferably, each of the inner flanges at its edge parallel to the central web in each case has a fastening web, which points respectively to the other flange of the inner flanges. This fastening web, which is part of the inner flange, is suitable, for example, for holding a locknut for the securing screw, so that the securing screw can be fastened in an especially simple manner. In the case of a bracket element that is held between the inner flanges, its clamping rails or clamping rail segments are clamped between the fastening webs.

In an embodiment, a corner connector can be provided between neighboring ends of two profiles. It can be inserted from the end with no or with little play in one section each of a space of both profiles, said space which is defined by the central web, the two inner flanges, and the two fastening webs, so that the profiles are at right angles to one another. It can be made in the form of two cuboids, which are at right angles at one end to one another and are dimensioned so that they can be inserted from the end of the profile with no or with little play in a section of a space defined by the central web, the two inner flanges, and the two fastening webs. The ends of two profiles can be connected to one another in this way with the least assembly effort. To this end, the ends of the profiles are formed preferably in the form of a bevel cut with 45° cutting angle.

The corner connector can have at least one thread and can be secured against slipping by means of a headless screw screwed into the thread through a first bored hole in the central web, so that the corner connection is especially secure.

In another preferred embodiment, each of the outer flanges at its edge parallel to the central web in each case has an exposed web, which points to the respectively other flange of the outer flanges and/or away from the respectively other flange of the outer flanges. If the exposed web of the outer flange, against whose outer side the paneling element abuts, has an exposed web pointing away from the other outer flange, the paneling element can be secured in this direction against slipping out sideways. A paneling element thus secured to two opposing profiles, which adjoins flush at the top and bottom a rack element in each case, is thereby completely secured from sliding or falling out.

Two auxiliary flanges can be arranged parallel to the inner flanges on the inner side of the profile so that the inner flanges lie between the auxiliary flanges. The distance between the auxiliary flanges is greater than the distance between the inner flanges and smaller than the distance between the outer flanges. The paneling element is fixable releasably by means of at least one auxiliary assembly fastening at one of the auxiliary flanges of at least one profile. The auxiliary assembly fastening facilitates, on the one hand, the assembly of the paneling element, for example, when first one of the rack elements was assembled beforehand, so that the paneling element does not hold itself on the frame. On the other hand, the auxiliary assembly fastening secures the paneling element in addition in the assembled state, particularly in the case of paneling elements that at the top or bottom do not adjoin a rack element but an exposed web. In this way, measurement tolerances remain also during fabrication or assembly of the parts of the display arrangement without consequences for the securing of the paneling elements against falling out.

The auxiliary assembly fastening can be formed as a hook and loop fastener made of two adhering strips, whereby the first strip is arranged on, particularly glued to, an auxiliary flange and the second strip on a back of the paneling element. Hook and loop fasteners represent an especially simple and cost-effective connection option.

At least one of the profiles can be fixable to a wall by means of a wall mounting element, whereby the wall mounting element has a plate with at least a second bored hole or at least one long hole for fastening to the wall and a bracket, and the plate abuts an outer side of one of the outer flanges and whereby the bracket, connected rigidly or especially adjustably to the plate, engages between one of the inner flanges and one of the auxiliary flanges or between the auxiliary flanges, so that the profile is secured against slipping in the direction of its inner side and in the normal direction of the plane enclosed by the frame. In particular, at least one wall mounting element, particularly two wall mounting elements, is provided at two opposing vertically arranged profiles, whereby the display arrangement is secured on two sides. Wall mounting elements can also be provided at a bottom and/or a top profile, to arrange the display arrangement at a certain height.

At least one fastening element can be provided for fastening the paneling element to at least one of the profiles.

In an embodiment, this fastening element may have the form of a retaining bracket, which is arranged on, particularly glued to, the back of the paneling element. The retaining bracket has an elastic locking element, which engages behind one of the inner webs or behind one of the auxiliary webs so that the paneling element is secured against falling out in the direction of its front. In particular, the arrangement of a plurality of retaining brackets between the paneling elements and the profiles, which they abut, offers additional security against the tipping out of paneling elements.

An alternative or additional fastening element can be a securing plate, which is arranged on, particularly glued to, the back of the paneling element. It has a securing clip, in which the headless screw of one of the corner connectors or another screw can be rotated, so that the paneling element is secured against falling out in the direction of its front. Thus, there is a double use for the headless screw. Another screw could be turned through another bored hole of the central web into the securing clip. In particular, the topmost and the lowest paneling element can be secured in such a way form-fittingly against falling out.

In another embodiment, an inner web can be arranged between the central web and the exposed webs on the inner sides of both outer flanges, whereby the distance between the edges of the inner webs is equal to the distance between the facing edges of the exposed webs. A retainer for a connecting profile results in this way, for example, in the form of a box profile, with which, for example, a plurality of display arrangements can be placed next to each other, without the frames tipping against one another to which the display arrangements are attached, for example, due to uneven wall surfaces, and having to be adjusted with effort. To enable the usability of a standard box profile with 35 mm×20 mm, the distance between the edges of the inner webs is preferably 20 mm to 21 mm and the distance from the outer side of central web to the outer side of the exposed web 17.5 mm to 20 mm. Alternatively, the distance of the outer flanges can also be selected so that a connection profile can be introduced in-between. In this case, the inner webs and the parts of the exposed web that point to the respectively other outer flange are omitted.

At least one adjusting element for height adjustment is arranged on a lower horizontal profile. In particular, however, two adjusting elements can be provided one each at an end of the lower profile, to facilitate the vertical adjustment of the display arrangement.

For this purpose, a box profile, for example, a standard box profile with 35 mm×20 mm, can be arranged between the outer flanges of the lower profile. The adjusting element comprises an adjusting screw, an adjusting nut, a third bored hole in a box profile side facing the profile, and a fourth bored hole in the central web of the lower profile. The third bored hole is designed sufficiently large for the through-insertion of a downward-pointing first adjusting screw end. An upward-pointing second adjusting screw end is provided with a slot, so that the adjusting screw can be rotated by a screwdriver. The fourth bored hole is sufficiently large for the through-insertion of the second adjusting screw end. The adjusting nut is arranged between the inner flanges and secured against rotating by the flanges, and the adjusting screw can be rotated in the adjusting nut. To adjust the height and alignment of the frame, the adjusting screw is first inserted through the fourth bored hole from the outer side of the profile with its second adjusting screw end and turned in the nut inserted sideways between the inner flanges. Next, the first adjusting screw end is inserted through the third bored hole in the box profile and guided between the outer flanges, until it hits either the central web or the first adjusting screw end. If the frame with the box profile is now placed on the floor in the assembly position, the adjustment of the height and/or alignment of the display arrangement can take place by turning of the second adjusting screw end by a screwdriver.

To be able to use standardized screws as adjusting screws or to distribute the load of the display arrangement better and less concentrated on the box profile part under load by the second adjusting screw end, the second adjusting screw end may be formed by a screw head, for example, a hexagonal screw head.

In another embodiment, two or three or four profiles can be connected to one another along their outer flanges by means of a connecting profile, inserted between the outer flanges of the profiles and formed as a box profile or L profile or T profile or X profile, whereby the connecting profile is designed so that it is held with no or with, little play between the outer flanges or the inner webs and exposed webs of the profile. Display arrangements of a plurality of frames arranged in a row at right angles, in a T shape, or cross shape can be set up in this way. For example, a display arrangement is also possible thusly with two profiles connected at their outer flanges, each of which has a bracket element at the same height, in which a circular rack element is held by the bracket elements. The fastening devices of the rack element can be concealed with a sufficiently large, tubular paneling element in a simple and decorative way.

When a connecting profile is used, the central web of at least one of the profiles and/or the connecting profile on its side facing the central web of at least one of the profiles is provided with at least one long hole running in the longitudinal direction, which expands at one of its end to a fifth bored hole. Corresponding to one of the long holes on the central web of at least one profile and/or on the connecting profile on its side facing the central web of at least one of the profiles, a dog point is provided, which is dimensioned so that it fits through the fifth bored hole and is then slidable in the long hole, so that a releasable connection results. In this way, profiles and connecting profiles can be hung into one another rapidly and without any tool.

On each side facing one of the central webs of the connecting profile, at least one long hole with a fifth bored hole can be provided. All long holes of a side facing one of the central webs have the respective fifth bored hole toward a first end of the connecting profile and all long holes of the other side facing one of the central webs have the respective fifth bored hole toward a second end of the connecting profile. To this end, all central webs are provided correspondingly with dog points. For example, an initial first display arrangement can be completed in this way. Then, a connecting profile is hung in one of the profiles. Profiles of further display arrangements are hung in turn in the connecting profile. Providing the assembly sequence, for example, printed or by means of stickers on the connecting profile is advantageous here.

In another embodiment, the fastening element can include a retainer, arranged on the back of the paneling element, with a pivotable bar, magnetically actuatable from the front of the paneling element. In a locking position, the bar engages behind one of the inner flanges or behind one of the auxiliary flanges, so that the paneling element is secured against falling out in the direction of its front. To this end, the bar is made of a ferromagnetic material. The retainer can be made in the form of a metal sheet, which is screwed or glued onto the back of the paneling element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 6 shows different views of two profiles connected by means of a connecting profile;

DETAILED DESCRIPTION

Figure 1:
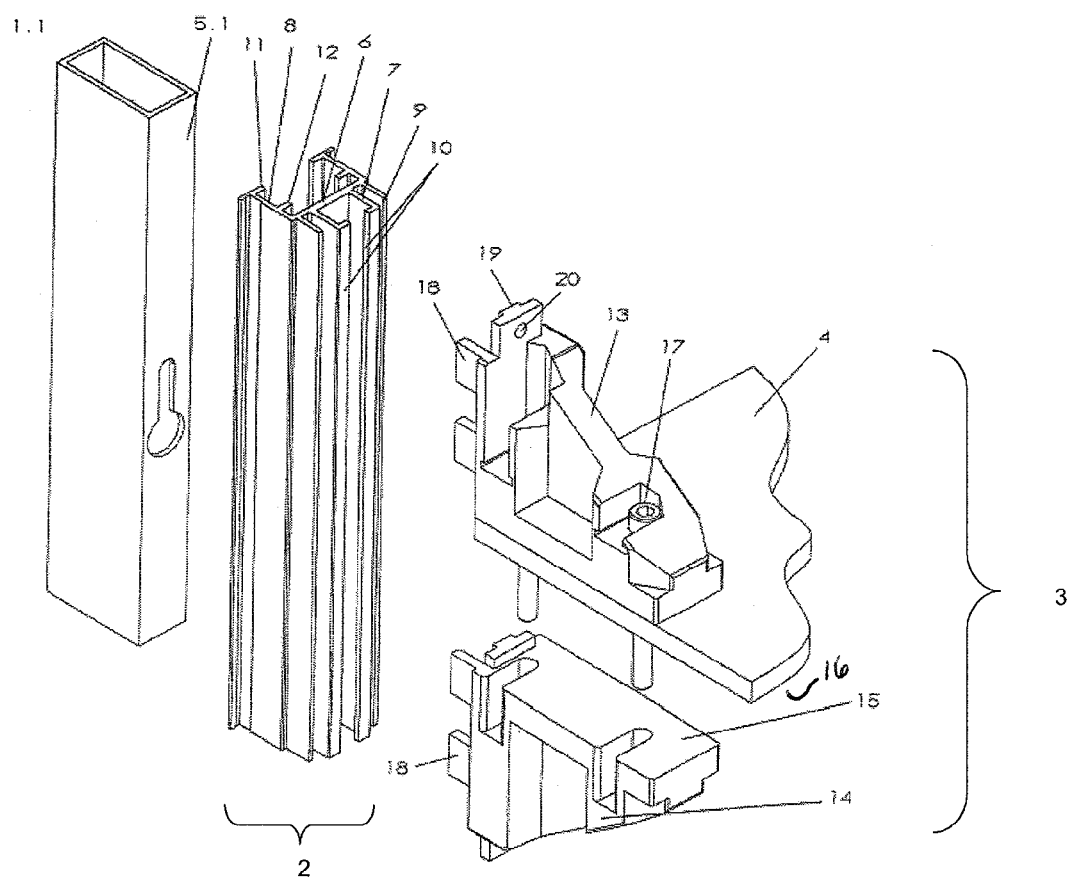
FIG. 1 shows a perspective exploded view of a section of a display arrangement with a profile and a bracket element, as well as a rack element.

FIG. 1 shows a perspective exploded view of a display arrangement 1.1 with a profile 2 and a bracket element 3, as well as a rack element 4 and a connecting profile 5.1. The profile made of aluminum has a central web 6, and arranged thereon two inner flanges 7, two outer flanges 8, and two auxiliary flanges 9. A fastening web 10 is arranged in each case on the inner flanges 7. The outer flanges 8 are each provided with an exposed web 11 and an inner web 12. Bracket element 3 is made in two parts of a top part 13 and a bottom part 14, which in the present case are made the same.

Top part 13 and bottom part 14 each have a tensioning surface 15. Rack element 4 can be tensioned between tensioning surfaces 15. Elastic layers 16, for example, made of silicon rubber, are provided for distribution of pressure in each case between a surface of rack element 4 and a tensioning surface 15. Rack element 4 can be fabricated of safety glass. To tension rack element 4, top part 13 and bottom part 14 are drawn against each other by means of two tensioning screws 17. Top part 13 and bottom part 14 are each provided with clamping rails 18, which by plugging onto inner flanges 7 can be connected with these form-fittingly and releasably. Clamping rails 18 are arranged pairwise at a distance to one another, which corresponds approximately to or is slightly smaller than the distance of the outer surfaces of inner flanges 7, so that a force closure results due to the elastic deformation of clamping rails 18 and/or inner flanges 7. Tabs 19 (here visible only at top part 13) attached to upper part 13 and lower part 14 provide for additional form closure. A securing hole 20, placed here in the area of tab 19, is used for receiving a securing screw (not shown), with which top part 13 and bottom part 14 can be fixed in addition to profile 2. This can be screwed, for example, into a securing nut, which is held behind fastening webs 10. Clamping rails 18 are made here as clamping rail segments, because this facilitates the fabrication of the bracket elements. They can also be made continuous, however. Connecting profile 5.1 has a width that corresponds approximately to the distance of exposed web 11 and inner web 12 from one another, so that it can be pushed between these. Another profile 2 can be pushed onto the part of the connecting profile 5.1, said part which then still projects from profile 2 (not shown), so that alignment of profiles 2 relative to one another can be omitted.

Figure 2:
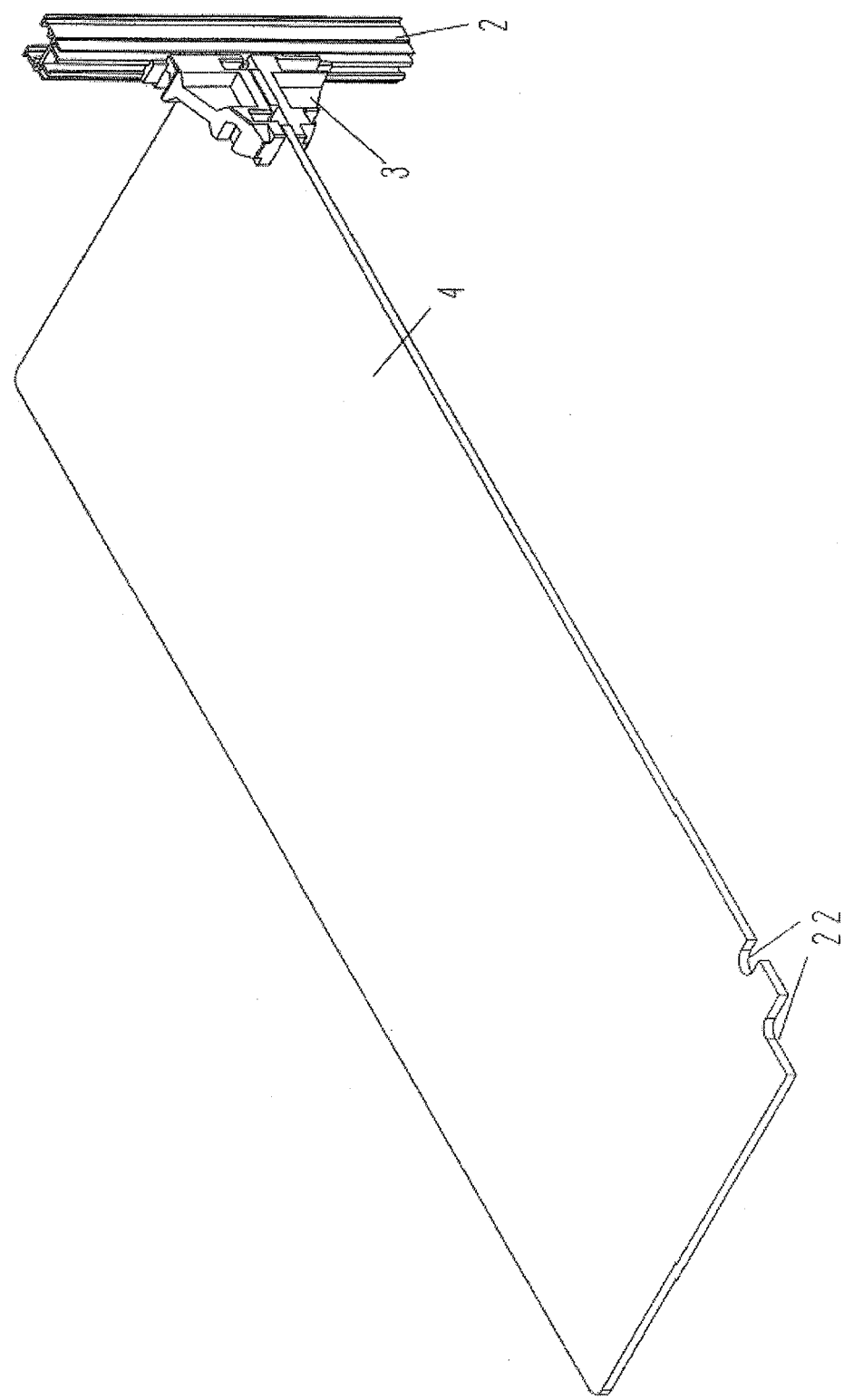
FIG. 2 shows a perspective diagram of a section of a display arrangement with a profile and a bracket element, as well as a rack element.

FIG. 2 shows profile 2, bracket element 3, and rack element 4, in a reduced view compared with FIG. 1. In this view, it becomes clear with use of notches 22 how rack element 4 is held by bracket element 3. Notches 22 are provided at the places through which the tensioning screws are guided or at which profile 2 proceeds.

Figure 3:
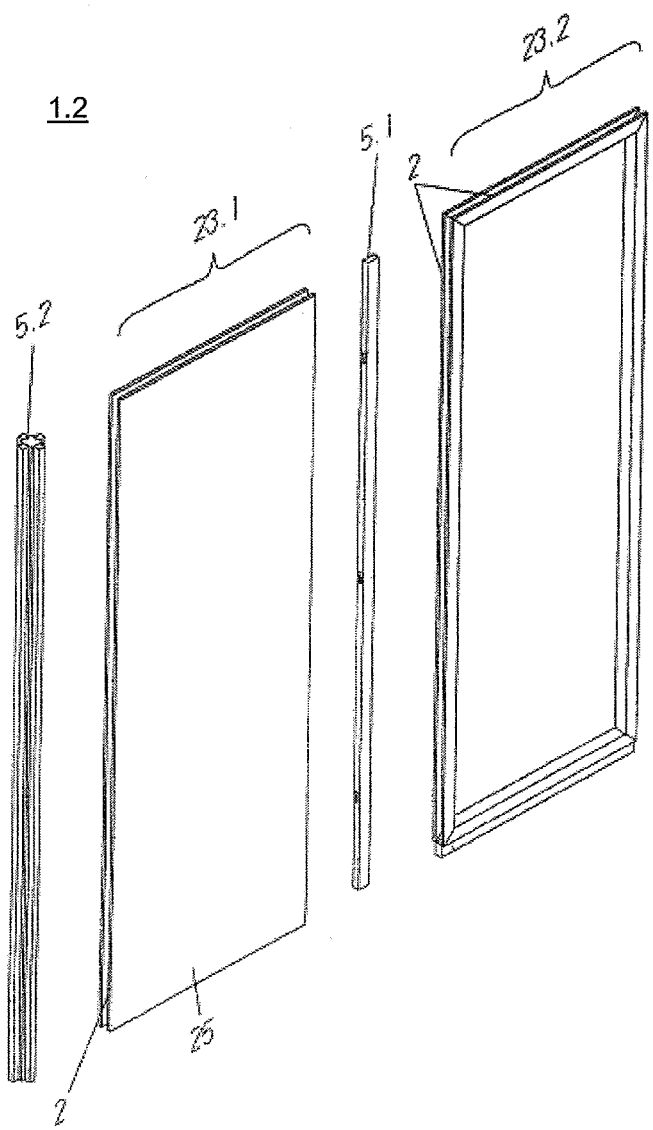
FIG. 3 shows a perspective diagram of a display arrangement made from two frames, connected to one another by a connecting profile, with paneling elements.
Figure 4:
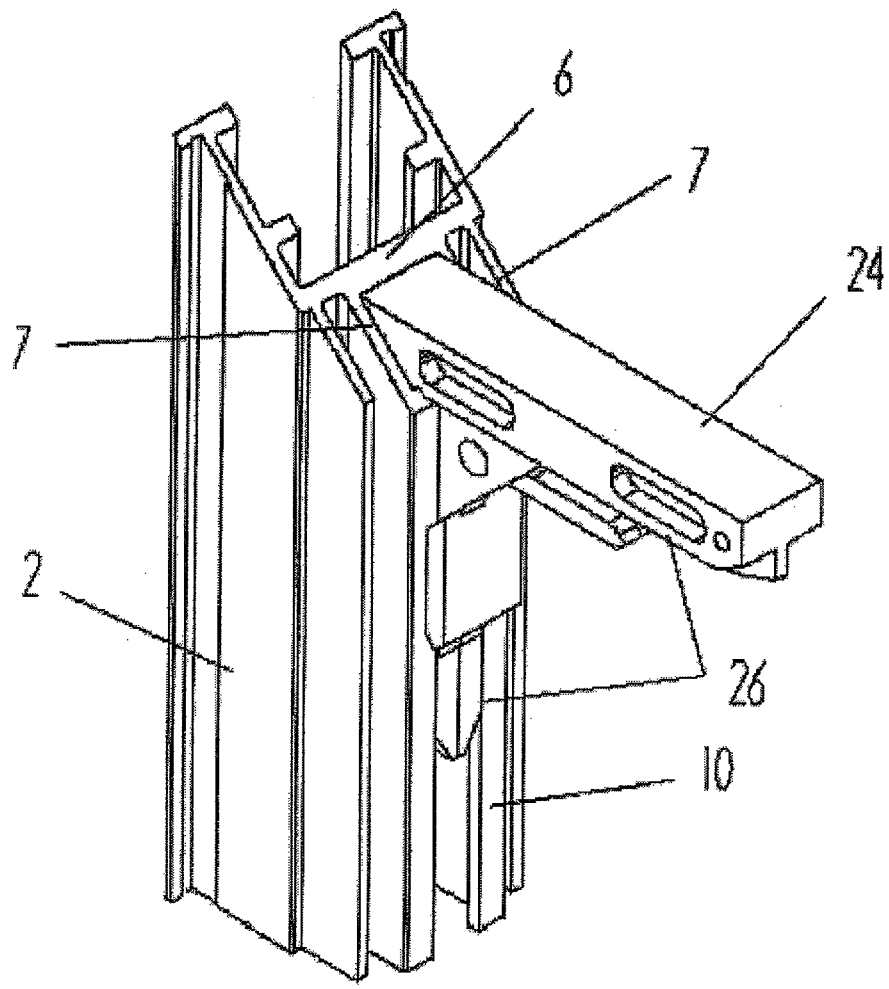
FIG. 4 shows a perspective diagram of a section of a display arrangement with a profile and corner connector.

FIG. 3 shows another embodiment of a display arrangement 1.2 made from two frames 23.1, 23.2, which are connected to one another by a connecting profile and are each made of four wrap-around profiles 2. Profiles 2 are provided at their ends each with a 45° bevel cut and connected to one another by corner connectors 24, as shown in FIG. 4. The left frame of the two frames 23.1 is provided with a paneling element 25. Paneling element 25 rests on one of the outer sides of each of outer flanges 8 of profiles 2 of frame 23.1 and is surrounded laterally by its exposed webs 11 (not visible here). Paneling element 25 can have the form of an opaque glass pane provided with decoration or textures. The two frames 23.1, 23.2 are connectable to one another with connecting profile 5.1 by pushing the profile between outer flanges 8 of facing profiles 2 of frames 23.1, 23.2 and hanging it, as shown in detail in FIGS. 6a to 6d. The shown connecting profile 5.1 is made in the shape of a box. Another variant of a connecting profile 5.2 is shown on the side of frame 23.1. This connecting profile 5.2 is made cross-shaped, so that four profiles can be connected to one another at right angles. Other variants for connecting profiles 5 are, for example, L-shaped for a 90° connection of two profiles 2 or T-shaped to connect three profiles 2. Display arrangement 1.2 shown here, of course, can also be provided with rack elements 4 and bracket elements 3, as shown in FIGS. 1 and 2. In this case, separate paneling elements 25, which adjoin rack elements 4 directly, would be used above, below, and between a plurality of rack elements 4, so that bracket elements 3 are concealed and the overall aesthetic impression is determined only by the design of paneling elements 25 and rack elements 4.

FIG. 4 shows a perspective diagram of a section of a display arrangement 1.1, 1.2 with a profile 2 and corner connector 24. It has two legs 26, which stand at right angles on one another and are dimensioned so that they can be inserted with no or with little play in a section of a space, defined by the central web 6, the two inner flanges 7, and the two fastening webs 10, from the end of the profile 2. Profiles 2, only one of which is shown for better clarity, are provided with a 45° bevel cut at their ends. In the interest of good union of corner connectors 24 with profiles 2, a light press fit is advantageous. The union can be secured against slipping in addition by means of threads cut in corner connectors 24 and headless screw screwed into the thread through a first bored hole in central web 6 of profile 2 (not shown).

Figure 5:
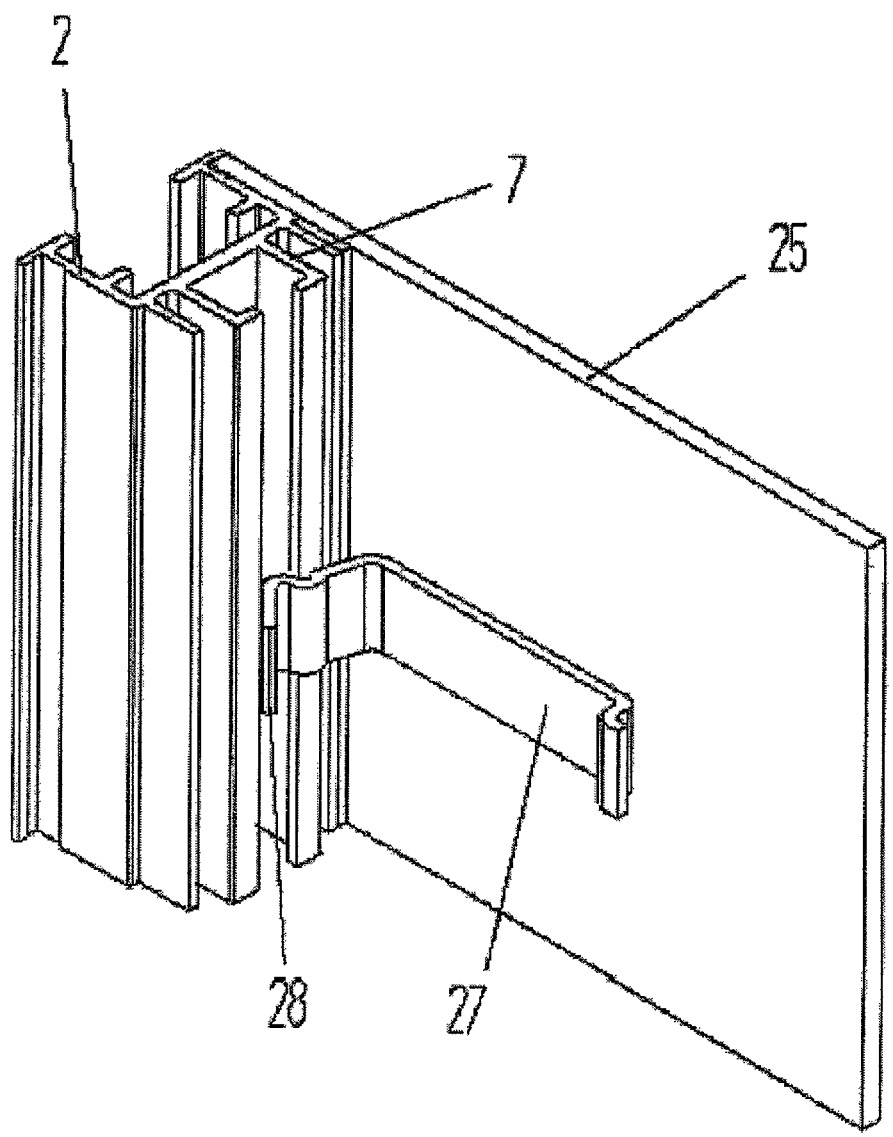
FIG. 5 shows a perspective diagram of a section of a display arrangement with a profile, a paneling element, and a fastening element.

FIG. 5 shows a perspective diagram of a section of a display arrangement 1.1, 1.2 with a profile 2, a paneling element 25, and a fastening element 27. In the shown example, fastening element 27 is formed as a retaining bracket, which is glued to the back of paneling element 25. It has an elastic locking element 28, which engages between the two inner flanges 7 such that paneling element 25 is secured against falling out in the direction of its front. Typically, a number of such or other fastening elements 27 are arranged on each paneling element 25.

FIGS. 6a to 6d show different views of two profiles 2 connected by means of a connecting profile 5.1. FIG. 6d shows a cross section, FIGS. 6a and 6c a longitudinal section along the plane designated by Y and Z, and FIG. 6b a longitudinal section along the plane designated by A and B. Connecting profile 5.1 is formed as a box profile, whose outer dimensions are selected so that with no or with little play it finds room, on the one hand, between exposed webs 11 and inner webs 12 and, on the other, between central webs 6 of profiles 2. Long holes 29.1, 29.2, which expand in each case at an end to a fifth bored hole 30, are provided at the sides of connecting profile 5.1 each facing a central web 6. For each long hole 29.1, 29.2, correspondingly on central web 6, a dog point 31 is provided, which is dimensioned so that it fits through fifth bored hole 30 and is then slidable in long hole 29.1, 29.2, so that a releasable connection results. In the case of long hole 29.1, the fifth bored hole points upward, and in the case of long hole 29.2 downward. If, for example, frame 23.1 is built first, connecting profile 5.1 with long hole 29.2 can be hung in profile 2 belonging to frame 23.1. Next, from the other side of connecting profile 5.1, profile 2 belonging to frame 23.2 is hung in long hole 29.1 and frame 23.2 is constructed. The assembly sequence can be labeled on profiles 2 and/or connecting profile 5.1, 5.2. As becomes clear from FIG. 6d, both frames 23.1, 23.2 are provided with paneling elements 25. The shown frame 2 of frame 23.2 is provided with auxiliary flanges 9. To facilitate the assembly of paneling elements 25 on frame 2, an auxiliary assembly fastening can be provided between auxiliary flange 9 and paneling element 25, for example, as a hook and loop fastener made of two adhering strips, whereby the first strip is arranged on auxiliary flange 9 and the second strip on the back of paneling element 25.

Figure 7:
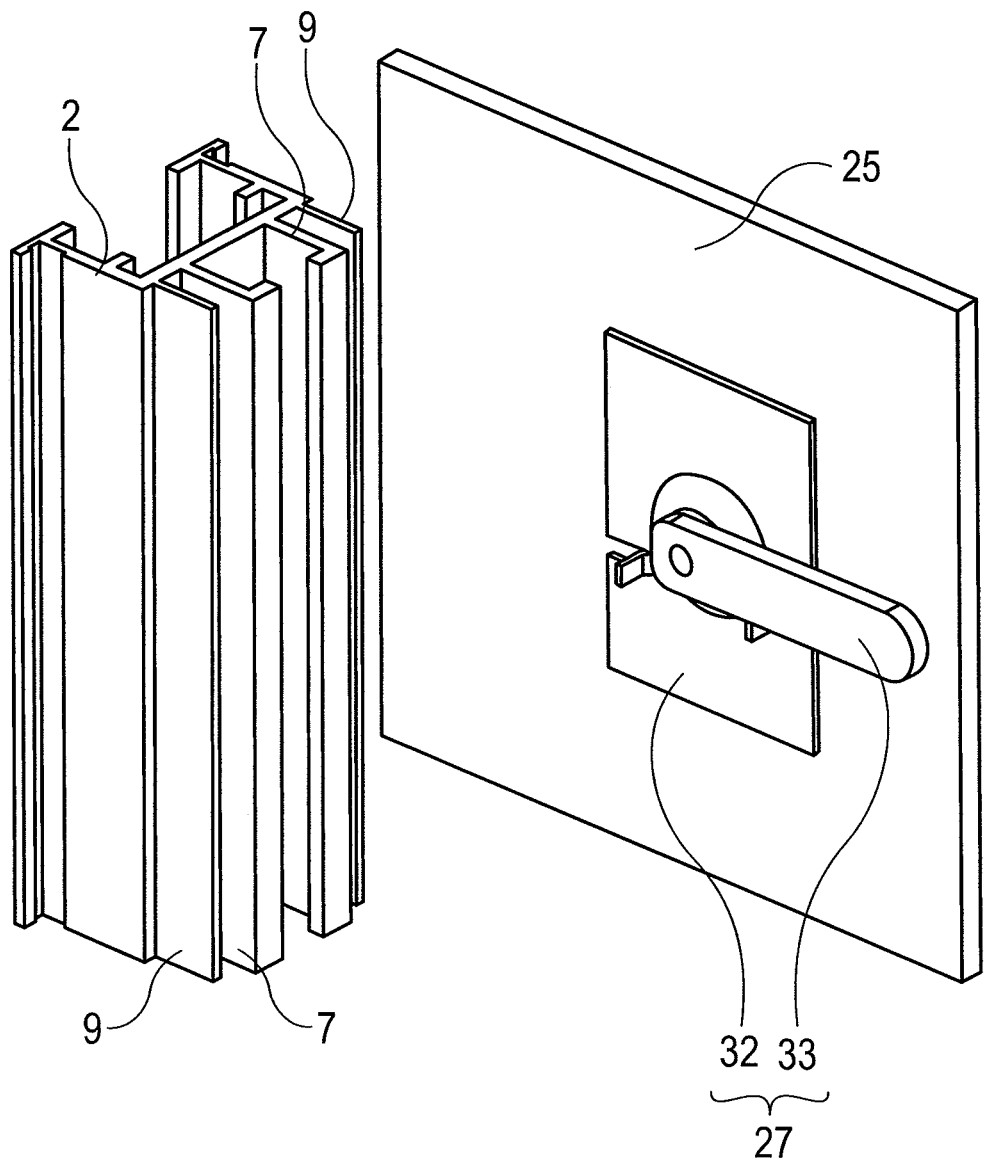
FIG. 7 shows a perspective diagram of a section of another embodiment of a display arrangement with a profile, a paneling element, and a fastening element in an unlocked position.

A perspective diagram of a section of another embodiment of a display arrangement 1.1, 1.2 with a profile 2, a paneling element 25, and a fastening element 27 is shown in FIG. 7. Fastening element 27 comprises a retainer 32 arranged on the back of paneling element 25 with a bar 33 which is magnetically actuatable from the front of paneling element 25 and is arranged pivotably on retainer 32. Bar 33 is in an unlocked position. Bar 33 can be pivoted into a locking position, shown in FIG. 8, from the front of paneling element 25 by, for example, a magnet.

Figure 8:
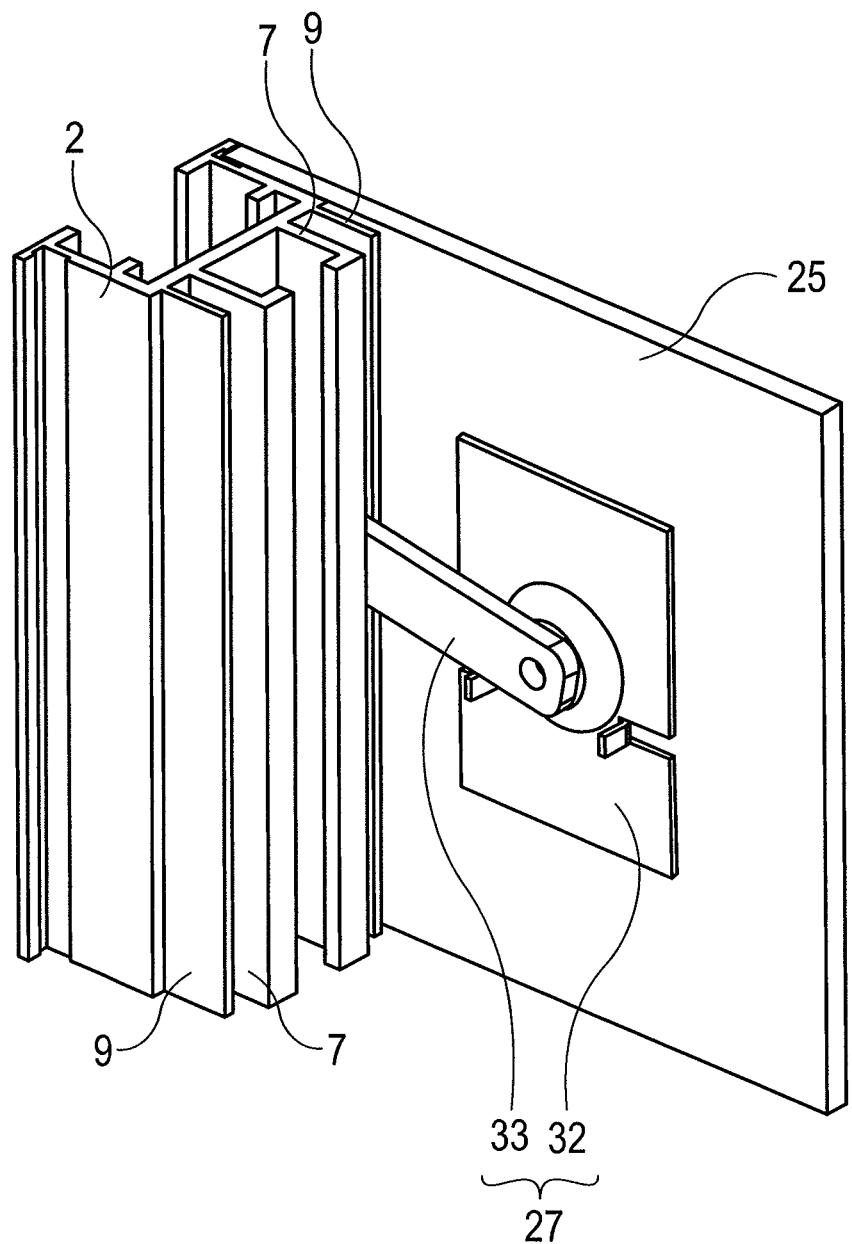
FIG. 8 shows a perspective diagram of a section of the display arrangement of FIG. 7 with the fastening element in a locking position.

In FIG. 8, bar 33 is in the locking position, in which it engages behind auxiliary flange 9, so that paneling element 25 is secured from falling out in the direction of its front.

Bar 33 can be made of a ferromagnetic material. Retainer 32 can have the form of a metal sheet, which is screwed or glued onto the back of paneling element 25.

Bar 33 can be made alternatively so that in the locking position, it engages behind one of inner flanges 7.

The shown clamping rails 18 can be made as clamping rail segments in the form of discontinuous clamping rails. In particular, the clamping rail segments at one of inner flanges 7 are offset to the clamping rail segments at the other flange of inner flanges 7 in the longitudinal direction of profile 2.

Profiles 2 are preferably fabricated as extruded profiles made of aluminum.

Display arrangement 1.2 can be combined with bracket elements 3 different from those shown, particularly also with one-part bracket elements, which, however, have at least clamping rails 18 or clamping rail segments.

Display arrangement 1.1 can be combined with profiles 2 different from those shown, which, however, have at least inner flanges 7.

The number of tensioning screws 17 on each bracket element 3 and accordingly the number and design of notches 22 in rack element 4 can be selected as different from what is shown in the exemplary embodiments.

Top part 13 and/or bottom part 14 may have a stop relative to one another, which has a minimum distance to limit the press force acting on rack element 4.

At least one of profiles 2 may be fixable to a wall by means of a wall mounting element, whereby the wall mounting element has, for example, a plate with at least one second bored hole or at least one long hole for fastening to the wall and a clamp, and the plate abuts an outer side of one of outer flanges 8 and whereby the clamp connected fixedly or especially adjustably to the plate engages between one of inner flanges 7 and one of auxiliary flanges 9 or between auxiliary flanges 9, so that profile 2 is secured against slipping in the direction of its inner side and in the normal direction of the plane enclosed by frames 23.1, 23.2.

At least one securing plate, which is arranged on, particularly glued to, the back of paneling element 25, can be provided alternatively or in addition as fastening element 27. It has a securing clip, in which the headless screw of one of the corner connectors 24 or another screw can be rotated so that paneling element 25 is secured against falling out in the direction of its front.

To enable the usability of a standard box profile with 35 mm×20 mm as connecting profile 5.1, the distance between the edges of inner webs 12 and exposed webs 11 is preferably 20 mm to 21 mm and the distance from the outer side of central web 6 to the outer side of exposed web 11 preferably 17.5 mm to 20 mm. Alternatively, the distance of the outer flanges 8 can also be selected so that a connecting profile 5.1 to 5.n can be introduced in-between. In this case, inner webs 12 and the parts of exposed webs 11 that point to the respectively other outer flange 8 are omitted.

Preferably, at least one adjusting element is arranged on a lower horizontal profile 2 for height adjustment. In particular, however, two adjusting elements are provided one each at an end of the lower profile 2, to facilitate the vertical adjustment of display arrangement 1.1, 1.2. For this purpose, a box profile, particularly a standard box profile with 35 mm×20 mm, is arranged between the outer flanges of the lower profile, into which various commercially available adjusting elements can be incorporated.

Another possible display arrangement 1 comprises two profiles 2 which are connected at their outer flanges 8 by means of a connecting profile 5.1 and each has a bracket element 3 at the same height, on which a circular rack element 4 is held. In so doing, the fastening devices of the rack element 4 can be concealed with a sufficiently large, tubular paneling element in a simple and decorative way.

Bracket element 2 can also be made so that clamping rails 18 by insertion between inner flanges 7 or fastening webs 10 can be connected to these.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A display arrangement comprising:
   at least one profile formed of one or more parts;
   at least one substantially horizontally oriented planar rack element; and
   at least one bracket element,
   wherein the at least one profile has at least one central web having two parallel inner flanges,
   wherein the at least one profile is oriented vertically,
   wherein the at least one bracket element includes a top part and a bottom part and at least one tensioning element, and each of the top part and bottom part has a tensioning surface, the tensioning surfaces being substantially parallel and drawn toward one another by the at least one tensioning element, and the top part and the bottom part each being provided with clamping rails and/or clamping rail segments, the clamping rails and/or clamping rail segments of the top part and the bottom part being plugged onto the inner flanges or inserted between the inner flanges to connect the top part and the bottom part to the at least one profile force-fittingly and releasably,
   wherein the at least one rack element is configured to be fixed between the tensioning surfaces of the at least one bracket element force-fittingly by tightening of the at least one tensioning element, and
   wherein the at least one profile has two parallel outer flanges on a side of the at least one central web opposite said two parallel inner flanges.

2. The display arrangement according to claim 1, wherein at least one vertical planar paneling element rests on an outer side of one of the outer flanges of the at least one profile.

3. The display arrangement according to claim 1, wherein a first one of the two parallel inner flanges at an edge parallel to the central web has a fastening web that is directed towards a fastening web on a second one of the two parallel inner flanges.

4. The display arrangement according to claim 3, wherein, a corner connector is provided at an end of the at least one profile with a first leg that is insertable from the end with no or with little play into a space of the at least one profile, the space being defined by the central web, the two inner flanges, and the two fastening webs, the corner connector including a second leg extending substantially at a right angle to the first leg.

5. The display arrangement according to claim 2, wherein two auxiliary flanges are arranged parallel to the inner flanges on an inner side of the at least one profile so that the inner flanges lie between the auxiliary flanges, wherein a distance between the two auxiliary flanges is greater than a distance between the inner flanges and smaller than a distance between the outer flanges, and wherein the paneling element is fixable releasably by at least one auxiliary assembly fastening at one of the auxiliary flanges of the at least one profile.

6. The display arrangement according to claim 1, wherein at least one adjusting element for height adjustment is arranged on the profile.

7. The display arrangement according to claim 6, wherein a box profile is arranged between the outer flanges of the at least one profile and wherein the adjusting element comprises an adjusting screw, an adjusting nut, a bored hole in a box profile side facing the at least one profile, and a bored hole in the central web of the profile, wherein the bored hole in the box profile is sufficiently large for through-insertion of a downward-pointing first end of the adjusting screw, wherein the bored hole in the central web is sufficiently large for insertion of a second end of the adjusting screw, wherein the adjusting nut is arranged between the inner flanges and wherein the adjusting screw is configured to be rotated in the adjusting nut.

8. The display arrangement according to claim 1, wherein the at least one profile comprises a first profile and a second profile connectable to one another along the outer flanges of the first profile and the second profile by a connecting profile inserted between the outer flanges of the first profile and the second profile and formed as a box profile, wherein the connecting profile is designed so that it is held with no or with little play between the outer flanges or inner webs of the first and second profiles and exposed webs of the first and second profiles.

9. The display arrangement according to claim 8, wherein the central web of at least one of the first and second profiles and/or the connecting profile on its side facing the central web of at least one of the first and second profiles is provided with at least one long hole running in a longitudinal direction, which expands at one of its ends to a long hole bored hole, and wherein, corresponding to the at least one long hole, on the central web of at least one of the first and second profiles and/or on the connecting profile on its side facing the central web of one of the first and second profiles, a dog point is provided, which is dimensioned so that it fits through the long hole bored hole and is then slidable in the at least one long hole so that a releasable connection results.

10. The display arrangement according to claim 1, wherein the at least one tensioning element is a tensioning screw.

11. A display arrangement comprising:
    a profile having a length direction and at least one central web having first and second parallel inner flanges;
    a planar rack element projecting from the profile in a direction perpendicular to said length direction; and
    a bracket connecting the planar rack element to the profile, the bracket comprising a top bracket element having a tensioning surface and a clamping rail and a bottom bracket element having a tensioning surface and a clamping rail, the top and bottom bracket elements being connected by a tensioning element and the top bracket element tensioning surface and the bottom bracket element tensioning surface being tensioned toward one another with the top bracket tensioning surface engaging a first surface of the planar rack element and the bottom bracket element tensioning surface engaging a second surface of the planar rack element to secure the planar rack element between the top bracket element and the bottom bracket element, and
    the clamping rails being force-fittingly and releasably mounted between the inner flanges, wherein the profile has two parallel outer flames on a side of the central web opposite said first and second parallel inner flanges.

12. The display arrangement according to claim 11, including a planar paneling element on an outer side of one of the outer flanges of the profile.

13. The display arrangement according to claim 11, wherein each of the first and second inner flanges has a distal end spaced from the central web, the distal end of each of the inner flanges including a fastening web, the fastening web of the first inner flange and the fastening web of the second inner flange being directed towards one another.

* * * * *